US008406534B2

(12) United States Patent
Tong et al.

(10) Patent No.: US 8,406,534 B2
(45) Date of Patent: Mar. 26, 2013

(54) SYSTEM AND METHOD FOR VIDEO BASED SCENE ANALYSIS

(75) Inventors: Xiaofeng Tong, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 12/165,478

(22) Filed: Jun. 30, 2008

(65) Prior Publication Data

US 2009/0324131 A1 Dec. 31, 2009

(51) Int. Cl.
*G06K 9/68* (2006.01)
*G06K 9/32* (2006.01)
(52) U.S. Cl. .......................... 382/219; 382/300
(58) Field of Classification Search .............. 382/219, 382/300, 305, 209
See application file for complete search history.

(56) References Cited

U.S. PATENT DOCUMENTS

| | | | |
|---|---|---|---|
| 6,738,424 B1 * | 5/2004 | Allmen et al. | 375/240.08 |
| 7,313,252 B2 * | 12/2007 | Matei et al. | 382/100 |
| 2003/0030638 A1 * | 2/2003 | Astrom et al. | 345/420 |

OTHER PUBLICATIONS

Farin, Dirk et al., "Robust Camera Calibration for Sport Videos using Court Models", SPIE Storage and Retrieval Methods and Applications for Multimedia, vol. 5307, 2004, 12 Pages.

Jiang, Shuqiang et al., "Mining Information of Attack-Defense Status From Soccer Video Based on Scene Analysis", IEEE International Conference on Multimedia & Expo (ICME), 2007, 4 Pages.
Kim, Taeone et al., "Physics-based 3D Position Analysis of a Soccer Ball from Monocular Image Sequences", IEEE International Conf. on Computer Vision (ICCV), 1998, 6 Pages.
Li, Jianguo et al., "Soccer Highlight Detection Using Two-Dependence Bayesian Network", IEEE International Conf. on Multimedia & Expo (ICME), 2006, 4 Pages.
Wantanabe, Tomoki et al., "A Soccer Field Tracking Method With Wire Frame Model From TV Images", IEEE International Conf. on Image Processing (ICIP), 2004, 4 Pages.
Xinguo Yu, Xin Y. et al., "3D Reconstruction and Enrichment of Broadcast Soccer Video", ACM Multimedia, Oct. 2004, 4 Pages.
Bebie, T. et al., "A Video-Based 3D-Reconstruction of Soccer Games", Eurographics 2000, vol. 19 (2000), No. 3, 10 pages.
Forsyth, D. et al., "Geometric Camera Models", Computer Vision: A Modern Approach, Chapter 5, Prentice Hall, 2003, 21 pages.
Hough, P. V. "Machine Analysis of Bubble Chamber Pictures", International conference on high-energy accelerators and instrumentation—CERN 1959, Sep. 19, 1959, 6 pages.

* cited by examiner

*Primary Examiner* — Daniel Mariam
(74) *Attorney, Agent, or Firm* — Blakely, Sokoloff, Taylor & Zafman LLP

(57) ABSTRACT

A method comprises searching in a video stream a first frame and a second frame that each has enough point correspondence with a image model, wherein the first frame is the nearest previous frame prior to a third frame, and the second frame is the nearest subsequent frame to follow the third frame. The method further comprises calculating an interpolation between a first mapping matrix of the first frame and a second mapping matrix of the second frame to obtain a third mapping matrix of the third frame that has insufficient point correspondence with the image model.

20 Claims, 6 Drawing Sheets

SYSTEM AND METHOD FOR VIDEO BASED SCENE ANALYSIS

BACKGROUND

Field registration may be used in image processing, such as scene reconstruction, visual navigation, game and virtual reality. For example, field registration may be used to find geometric correspondence, e.g., a homography matrix, between a screen image and a field model that may be predefined in accordance with a world coordinate system and map the screen image to a predefined field model based on the homography matrix. For example, a homography matrix may indicate a correspondence between a world coordinate system of the field model and an image coordinate system of the screen image. Some factors may influence the time for field registration, e.g., including accuracy of the geometric correspondence; and obtaining a motion transition matrix of a frame by motion estimation.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to utilize one or more non-volatile memories in a hybrid hard disk environment. The implementation of the techniques is not restricted in hybrid hard disk environment; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the specification.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
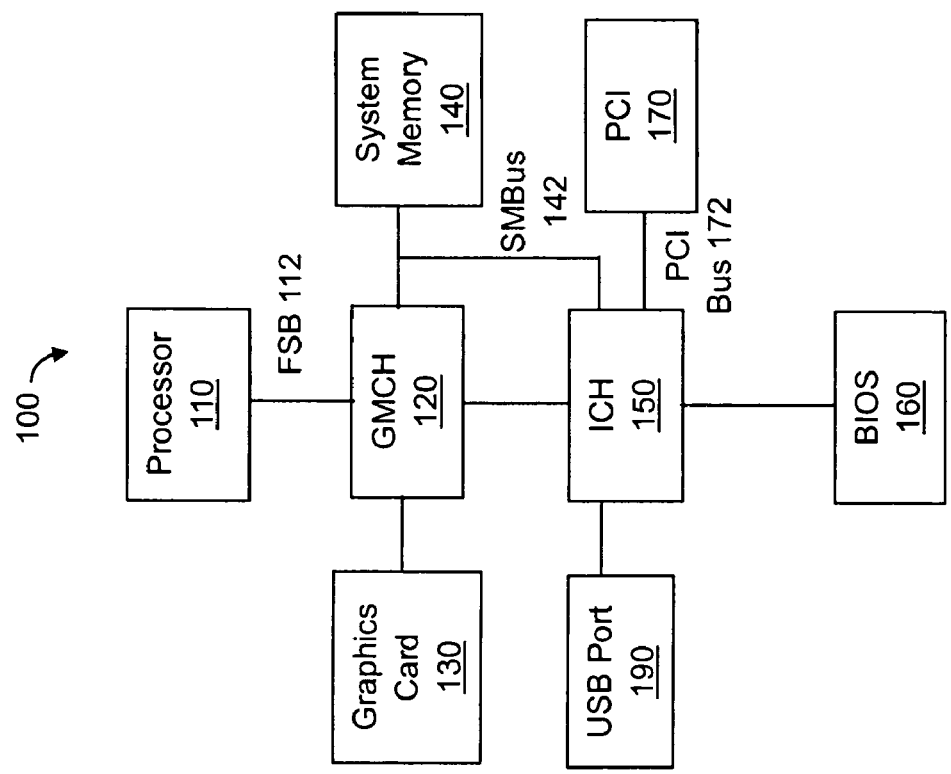
FIG. 1 is a schematic diagram of an embodiment of a processor-based system.

FIG. 1 illustrates a block diagram of an exemplary embodiment of an electronic system that may comprise a processor based system that may correspond to an example of a desktop board 100, also referred to as a motherboard. The desktop board 100 may comprise a processor 110 that may be coupled to a graphics and memory controlled hub (GMCH) 120, e.g., via a front side bus (FSB) 112. In some embodiments, the desktop board 100 may comprise more processors 110. GMCH 120 may be coupled to an I/O controller hub (ICH) 150. The GMCH 120 may support access to a system memory 140 and a graphics card 130. For example, the system memory 140 may comprise DDR and/or dual in line memory (DIMM), or any other memory. The ICH 150 may couple to basic I/O system (BIOS) 160 that may be stored in non-volatile memory (e.g., a flash memory, a firmware hub, etc.). The ICH 150 may support e.g., an SMBus (system memory bus) 142, a low pin count (LPC) or Serial Peripheral Interface (SPI) that may be coupled to the BIOS 160, a PCI bus (coupled to one or more PCI slots) 172, and one or more USB ports 190. In one embodiment, the BIOS 160 may provide instructions and operations to initialize the desktop board 100.

In another embodiment, those skilled in the art will understand that in some embodiments the BIOS 160 does not necessarily directly control the desktop board 100. In some embodiments, the BIOS 160 may provide instructions and operations to a general purpose input/output port (GPIO, for example, may locate at a South Bridge-ICH or Super I/O).

Figure 2:
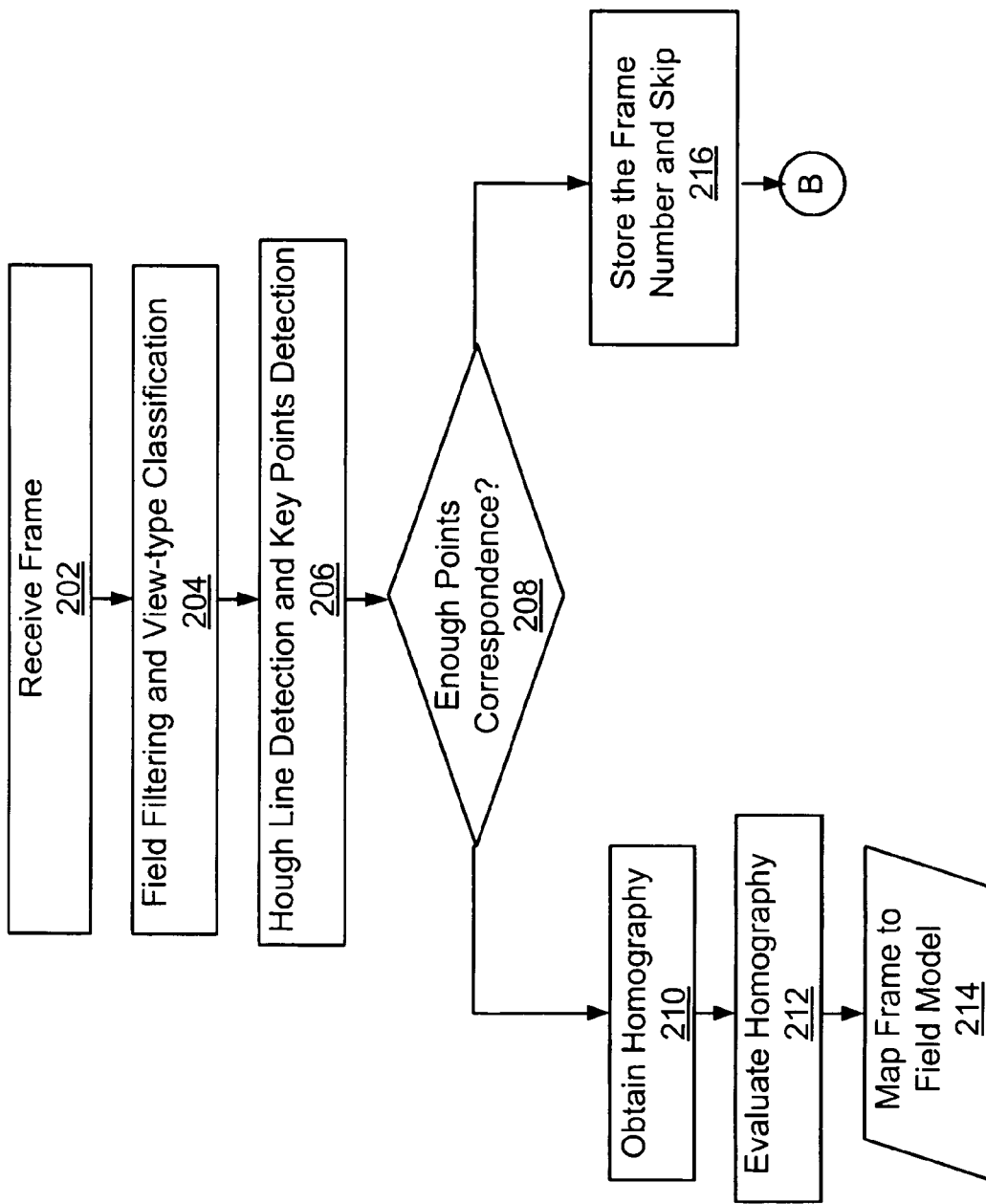
FIG. 2 is a flow chart of a method in accordance with some embodiments of the invention.

FIG. 2 illustrates an embodiment of a method that may be used by, e.g., processor 110 of FIG. 1, for field registration. In one embodiment, the method may be described with reference to FIGS. 3 and 4 that illustrate example images of a soccer field. In some embodiments, the method may be used in scene reconstruction, visual navigation, game and virtual reality, tactics, attach and defense time distribution statistics, motion analysis, video content enrichment, virtual content and/or advertisement insertion, camera calibration, or any other scene processing or analysis. In one embodiment, in block 202, the processor 110 may receive a frame 302 that may correspond to an image of a soccer field 304a. The frames 302 may have a MPEG2 format; however, in some embodiments, the received frames 302 may have any other format. In block 204, the processor 110 may filter a received frame 302 to extract a field region or dominant color region 304 and/or classify a view type of the received frame 302 based on a size of the field region 304. In another embodiment, the processor 110 may select a frame 302 to be processed in block 306, e.g., based on a size of the field region 304.

In one embodiment, the processor 110 may accumulate one or more color histograms that may each relate to a received frame 302 to determine a dominant color in the video stream. In one embodiment, the color histograms may be obtained based on Hue-Saturation-Value (HSV). In another embodiment, the processor 110 may further segment a frame 302 into one or more regions based on the determined dominant color. For example, the processor 110 may segment a frame into a field region 304 that may have the determined dominant color and/or a non-field region 306 that may not be consistent with the determined dominant color. For example, referring to FIG. 3, a determined dominant color may comprise a color of the soccer field 304a, e.g., grass color.

In one embodiment, the processor 110 may compare a first size of a field region 304 of a frame 302 and a second size of an object in the field region 304 to classify a view type of the frame 302. In one embodiment, the view type may comprise global view, medium view, close-up view and out of view; however, in some embodiments, any other view type may be utilized based on a content in a frame. In one embodiment, in response to determining that a ratio of a first size of a field region 304 in a frame 302 to a second size of an object in the field region 304 is in a predetermined ratio range, the processor 110 may determine the frame 302 is a global view that corresponds to the predetermined ratio range. In another embodiment, in response to determining a frame 302 comprises a ratio of the first size to the second size that is in a predetermined ratio range, the processor 110 may select the frame 302 to analyze the frame 302 in block 206, e.g., to perform Hough line detection and key point detection on the selected frame 302. For example, the second size may represent an average height h2 of one or more objects X in the field region 304. In one embodiment, an object X may refer to a soccer player or a ball. In another embodiment, the first size may represent an average height h1 of the field region 304. In another embodiment, the flow may return to block 202, in response to determining that the ratio of the frame 302 may not match the predetermined ratio range and/or the frame 302 may not be a global view.

In one embodiment, the processor 110 may further perform a morphological filter on the selected frame 302 to eliminate the non-field region 306. The processor 110 may reserve one or more pixels in the field region 304 that may not be consistent with the dominant color. In another embodiment, the processor 110 may further perform connect-component analysis on the field region 304 to remove one or more pixels that may correspond to one or more objects X in the field region 304, e.g., a player and/or a football.

Figure 4:
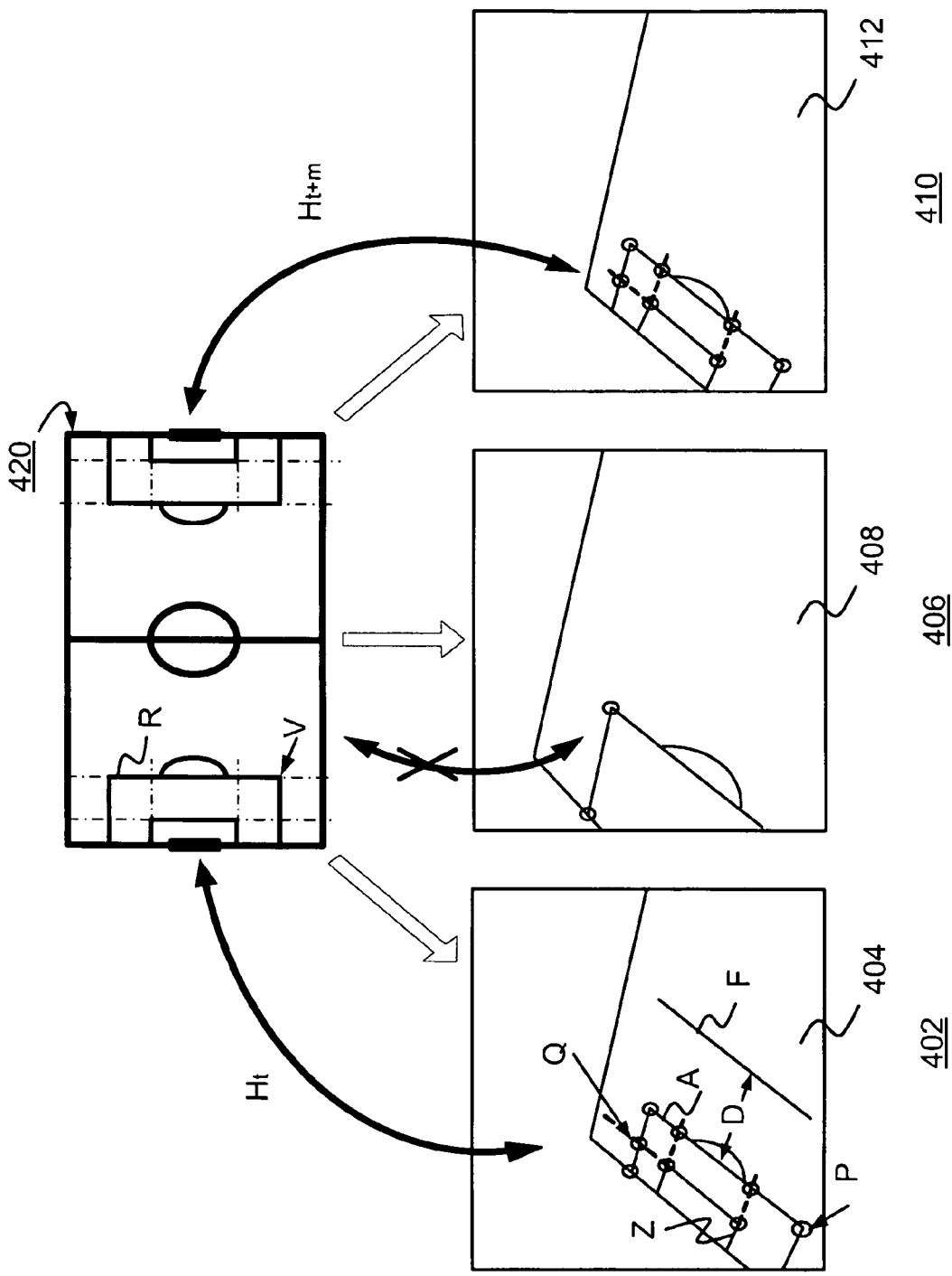
FIG. 4 is a schematic diagram of an embodiment of frames of a soccer field and a corresponding field model.

In block 206, the processor 110 may detect one or more lines and one or more key points in the selected frame 302. Referring to FIG. 4, it is illustrated an example of a frame 402 that may be selected in block 204. In one embodiment, the frame 402 may have a type of a global view. In one embodiment, the selected frame 402 may comprise a field region 404. The processor 110 may perform Hough transform on the field region 404 to detect one or more line marks, such as A and Z in the field region 404. The processor 110 may further classify the one or more line marks into a first set of line marks and a second set of line marks. In one embodiment, a first set of line marks, such as Z, may correspond to a horizontal direction in the field model 320 and a second set of line marks such as A may correspond to a vertical direction in the field model 320. For example, the processor 110 may classify a line mark based on a slope of the line mark.

In block 206, the processor 110 may further detect one or more key points in a frame 402. In one embodiment, a key point may comprise an intersection point, such as P or Q, that may each correspond to two line marks in the field region 404. In one embodiment, a key point may comprise an intersection point such as Q that may be formed by an extended portion of at least one of the two line marks.

In diamond 208, the processor 110 may determine if a number of the detected key points (e.g., intersection points) or point correspondence is in a predetermined threshold range, e.g., equal to or larger than the predetermined threshold. In one embodiment, the predetermined threshold may equal to four; however, some embodiments may use a different number. In response to determining that the number of the detected intersection points is equal to or larger than the predetermined threshold, the flow may go to block 210 to map the detected intersection points to one or more points in a predetermined field model or image model, e.g., 420 of FIG. 4. Oppositely, in response to determining that the number of the detected intersection points is smaller than the predetermined threshold, the flow may go to block 216 to store a frame number of the selected frame 402. The flow may further skip to point B, e.g., a flow of FIG. 5.

In block 210, the processor 110 may map a detected intersection point P to a corresponding virtual point, e.g., V, in the model field 420, e.g., based on a coordinate of the intersection point P. In one embodiment, the processor 110 may locate a virtual point V that may be an intersection point corresponding to two field model lines in the model field 420. In another embodiment, the processor 110 may select a predetermined number of pairs of intersection points and virtual points, wherein each pair may comprise an intersection point in the frame 402 and a mapped virtual point in the field model 420. For example, the predetermined number of pairs may equal to four; however, in some embodiments, a different number may be used. For example, the predetermined number may equal to the predetermined threshold. The processor 110 may calculate a mapping matrix, e.g., a homography matrix based on coordinates of, e.g., each four pairs of mapped intersection points and virtual points; however, in some embodiments, a different number of pairs may be used to calculate the homography matrix.

In block 212, the processor 110 may evaluate each homography matrix obtained in block 210 based on line correspondence between the field model 420 and the frame 402; however, in some embodiments, the evaluation may be made based on point correspondence between the field model 420 and the frame 402. In one embodiment, for each homography matrix, the processor 110 may map a field model line R that corresponds to an original frame line A onto the frame 402 based on the homography matrix to obtain a mapped frame line F. For each homography matrix, the processor 110 may measure an average distance D between a pixel on an original model line A and a corresponding pixel on a mapped frame line F. In another embodiment, the processor 110 may calculate an error $\epsilon$ based on the distance D according to equation (1) to evaluate a homography matrix:

$$\varepsilon = \frac{1}{N}\sum_{i=0}^{N-1} \min(D(i), \tau) \quad (1)$$

wherein N may refer to a number of pixels on a field line or a mapped frame line, $\tau$ may refer to a constant to restrict a maximum error and/or noise. In block 212, the processor 110 may select a homography matrix that may have an error ε within a predetermined error range. In block 214, the processor 110 may map an image of a field region 404 to the field model 420 based on the selected homography matrix.

Figure 3:
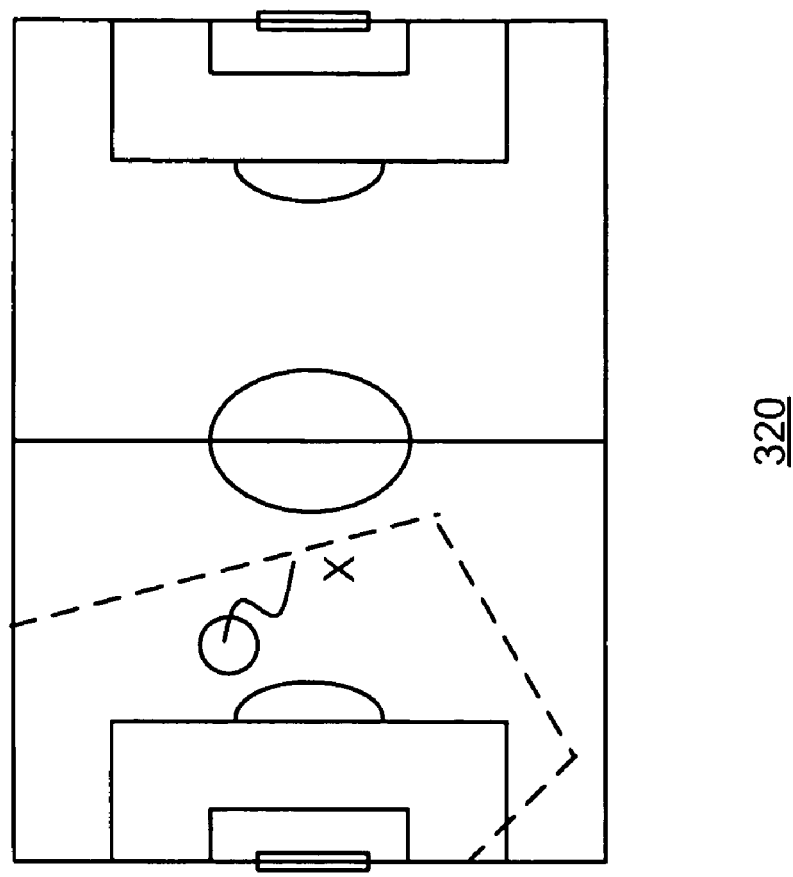
FIG. 3 is a schematic diagram of an example of a frame of a soccer field and a corresponding field model.
Figure 3:
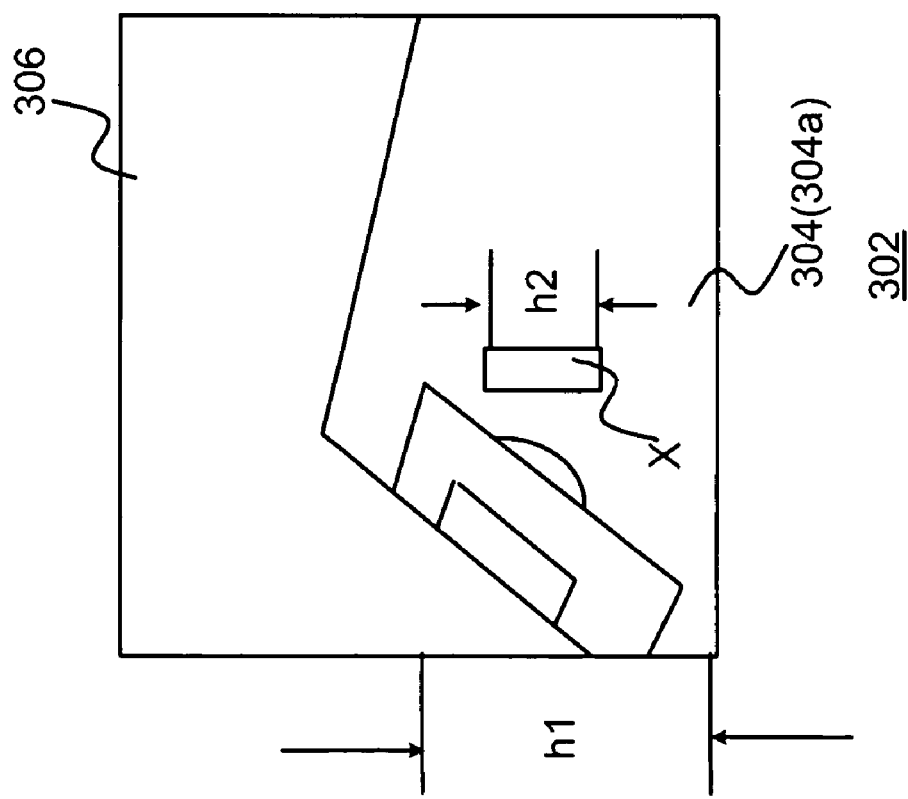

While the method of FIG. 2 is illustrated to comprise a sequence of processes, the method in some embodiments may perform illustrated processes in a different order. In some embodiments, the flow of FIG. 2 may be performed on each frame in a simultaneous manner. While FIGS. 3 and 4 illustrate an example of a field model, in some embodiment, a different model may be utilized based on a content of an image. While FIG. 4 illustrates to utilize a homography matrix to represent correspondence between a world coordinate system of a field model and an image coordinate system of an image frame, in some embodiments, any other mapping matrix may be utilized.

Figure 5:
FIG. 5 is a schematic diagram of a method in accordance with some embodiments of the invention.

FIG. 5 illustrates an embodiment of a method that may determine a homography matrix of a frame that may not have enough key points or point correspondence to obtain the homography matrix. Referring to FIG. 4, it is illustrated an example of the frame 406 that may not have enough point correspondence. In block 502, the processor 110 may perform a first search in a video stream that comprises the frame 406 to find the nearest previous frame that may have enough point correspondence or key points. In another embodiment, the processor may search in a backward direction from frame 406 for the nearest previous frame, for which a homography matrix is available, e.g., based on the flow of FIG. 2. In one embodiment, in response to detecting the nearest previous frame, e.g., 402 of FIG. 4, the processor 110 may obtain a first homography matrix of the nearest previous frame 402. For example, the processor 110 may perform the first search in the video stream in a backward direction from the frame 406.

In block 504, the processor 110 may perform a second search in the video stream to find the nearest subsequent frame 410 that may have enough point correspondence. In one embodiment, in response to detecting the nearest subsequent frame, e.g., 410 of FIG. 4, the processor 110 may obtain a second homography matrix of the nearest subsequent frame 410. For example, the processor 110 may perform the second search in the video stream in a forward direction from the frame 406. In some embodiments, frame 402 is a previous frame adjacent to frame 406 and frame 410 is a subsequent frame adjacent to frame 406. In another embodiment, frame 406 is a middle frame that is sandwiched between frame 402 and frame 410. In some embodiments, there may be one or more frames having insufficient point correspondence between frame 406 and the nearest previous frame 402 or between frame 406 and the nearest subsequent frame 410.

In block 506, the processor 110 may obtain a homography matrix of the frame 406 based on the first homography matrix obtained in block 502 and the second homography matrix obtained in block 504, e.g., by a linear interpolation. In one embodiment, the processor 110 may calculate an interpolation, e.g., a linear interpolation, between the first homography matrix and the second homography matrix to obtain the nomography matrix of frame 406. Referring to the example of FIG. 4, it may be assumed that frame 402 may correspond to time t, frame 406 may correspond to time t+k and frame 410 may correspond to time t+m, wherein k<m. In one embodiment, the processor 110 may calculate a homography matrix $H_{t+k}^{ij}$, of frame 406 that is sandwiched between frames 402 and 410 according to equation (2):

$$H_{t+k}^{ij} = \frac{k}{m}(H_{t+m}^{ij} - H_t^{ij}) + H_t^{ij} \quad (2)$$

wherein $H_t^{ij}$ and $H_{t+m}^{ij}$ may represent the first homography matrix and the second homography matrix, respectively, and wherein i and j may represent a row number and a column number of an element in a homography matrix, e.g., {i, j}={0, 1, 2}.

Figure 6:
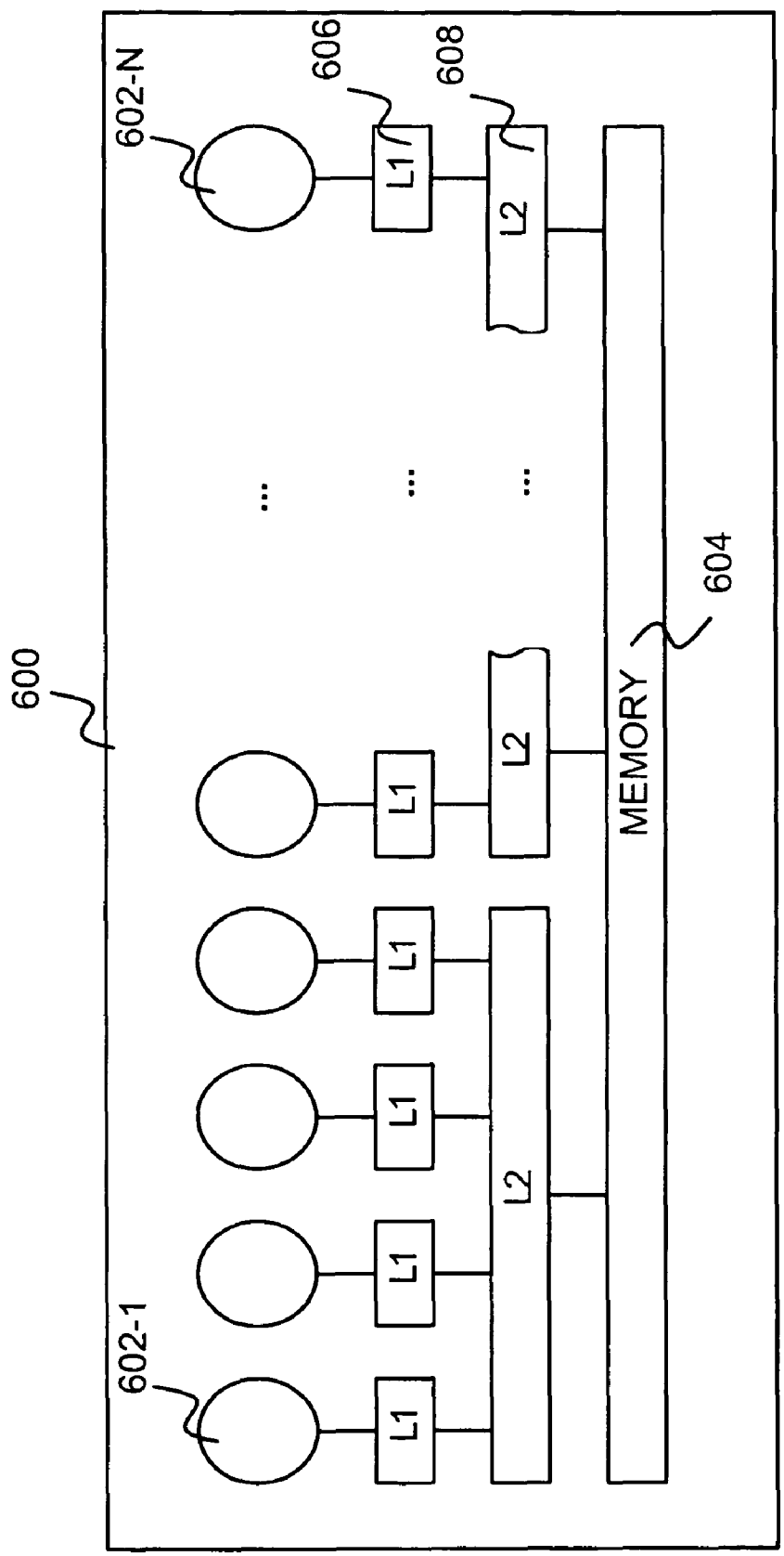
FIG. 6 is a schematic diagram of an embodiment of a system in accordance with some embodiments of the invention.

Referring to FIG. 6, it is illustrated an embodiment of a system 600 that may comprise a multi-core processor based system. In one embodiment, the system 600 may comprise one or more processors 602-1 to 602-N, wherein N may represent any positive integer. The processors 602-1 to 602-N may perform actions in response to executing instructions. For example, processors 602-1 to 602-N may executes programs, perform data manipulations and control tasks in the system 600. The processors 602-1 to 602-N may be any type of processor adapted to perform operations in memory 604. For example, processors 602-1 to 602-N may be a microprocessor, a digital signal processor, a microcontroller, or any other processors. In one embodiment, the processors 602-1 to 602-N may not be dedicated to the use of memory 604, and the processors 602-1 to 602-N may perform operations in memory 604 while also performing other system functions.

In one embodiment, the system 600 may further comprise one or more first-level buses 606 and one or more second-level buses 608 that may couple one or more processors 602-1 to 602-N to memory 604. In one embodiment, a first-level bus 606 may correspond to one of the processors 602-1 to 602-N. In another embodiment, the second-level bus 608 may be coupled to a set of one or more first-level buses 606. In one embodiment, processors 602-1 to 602-N may perform at least a portion of the flow of FIG. 2 or FIG. 5 in parallel or simultaneously. In some embodiments, the parallel operations of the processors 602-1 to 602-N may eliminate data dependency. The processors 602-1 to 602-N may provide a concurrency friendly system. For example, a first processor may process a first frame according to the flow of FIG. 2 or FIG. 5 while a processor 602-2 may process a second frame according to the flow of FIG. 2 or FIG. 5.

While the method of FIG. 5 is illustrated to comprise a sequence of processes, the method in some embodiments may perform illustrated processes in a different order. In some embodiments, the flow of FIG. 5 may be performed on each frame that may not have sufficient point correspondence in a simultaneous manner.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:
1. A system, comprising:
   a memory;
   a first processor that is coupled to the memory, wherein the first processor is to perform a first linear interpolation between a first mapping matrix of a previous frame and a second mapping matrix of a subsequent frame to obtain a third mapping matrix of a third frame to a model, in response to determining that the third frame may have insufficient key points to obtain the third mapping matrix, wherein the third frame is located between the previous frame and the subsequent frame.

2. The system of claim 1, wherein the first processor is to search for the previous frame in a video stream that comprises the third frame in a backward direction from the third frame, wherein the previous frame is the nearest previous frame that has enough point correspondence to obtain the first mapping matrix.

3. The system of claim 1, wherein the first processor is to search for the subsequent frame in a video stream that comprises the third frame in a forward direction from the third frame, wherein the subsequent frame is the nearest subsequent frame has enough point correspondence corresponding to the second mapping matrix.

4. The system of claim 1, further comprising:
a second processor that is coupled to the memory, wherein the second processor perform a second linear interpolation between two mapping matrixes of two frames that are adjacent to a middle frame to obtain a fourth mapping matrix of the middle frame to the model.

5. The system of claim 4, wherein the second processor is to perform the second linear interpolation in parallel with the first processor performing the first linear interpolation.

6. The system of claim 1, wherein the first processor is to perform a Hough transform on the previous frame to obtain an intersection point, and to obtain and to obtain the first mapping matrix based on the intersection point and a corresponding intersection point in the model.

7. The system of claim 1, wherein the first processor is further to map a first model line in the model that corresponds to an original frame line to the previous frame to obtain a mapped frame line based on the first matrix and to evaluate the first mapping matrix based on a distance between a pixel on the original model line and a corresponding pixel on the mapped frame line.

8. The system of claim 7, further comprising:
a second processor that is coupled to the memory, the second processor is to evaluate the second mapping matrix a simultaneously as the first processor evaluating the first mapping matrix.

9. A method, comprising:
searching, by a computing device, in a video stream a first frame and a second frame that each has enough point correspondence with a image model, wherein the first frame is the nearest previous frame prior to a third frame, and the second frame is the nearest subsequent frame to follow the third frame; and
calculating, by the computing device, an interpolation between a first mapping matrix of the first frame and a second mapping matrix of the second frame to obtain a third mapping matrix of the third frame that has insufficient point correspondence with the image model.

10. The method of claim 9, further comprising:
mapping the third frame to the image model based on the third mapping matrix by the computing device.

11. The method of claim 9, further comprising:
performing, by the computing device, Hough line detection on the first frame to obtain a set of one or more intersection point in the first frame; and
determining, by the computing device, the first frame has enough point correspondence with the image model in response to determining that a number of the intersection points is in a threshold range.

12. The method of claim 9, further comprising:
mapping a model line in the image model to the first frame to obtain a mapped frame line based on the first mapping matrix, wherein the model line corresponds to an original frame line in the first frame; and
evaluating the first mapping matrix based on a distance between a pixel on the mapped frame line and a corresponding pixel on the original frame line.

13. The method of claim 9, further comprising:
filtering, by the computing device, at least one of the first frame, the second frame and the third frame to obtain a dominant color region; and
performing, by the computing device, Hough transform on the dominant color region to obtain point correspondence of the at least one frame.

14. A tangible non-transitory machine readable medium comprising a plurality of instructions that in response to being executed result in a computing device
in the event that a current frame has insufficient point correspondence with a model, detecting in a video stream the nearest previous frame and the nearest subsequent frame that have enough point correspondence with the model; and
performing a linear interpolation between a first homography matrix of the nearest previous frame and the nearest subsequent frame to obtain a third homography matrix of the current frame.

15. The tangible non-transitory machine readable medium of claim 14, further comprising a plurality of instructions that in response to being executed result in a computing device
mapping the current frame to the model based on the third homography matrix.

16. The tangible non-transitory machine readable medium of claim 14, further comprising a plurality of instructions that in response to being executed result in a computing device
obtaining a set of one or more line marks in the nearest previous frame; and
obtaining a set of one or more intersection points of the line marks to calculate the first homography matrix.

17. The tangible non-transitory machine readable medium of claim 14, further comprising a plurality of instructions that in response to being executed result in a computing device
obtaining one or more line marks in the nearest previous frame;
classifying the set of line marks into a first set that corresponds to a horizontal direction in the model and a second set that corresponds to a vertical direction in the model; and
obtaining a set of one or more intersection points that each formed by one in the first set and one in the second set to calculate the first homography matrix.

18. The tangible non-transitory machine readable medium of claim 14, further comprising a plurality of instructions that in response to being executed result in a computing device
evaluating the first homography matrix based on a line correspondence between the model and the nearest previous frame.

19. The tangible non-transitory machine readable medium of claim 18, further comprising a plurality of instructions that in response to being executed result in a computing device
evaluating the second homography matrix in parallel with evaluating the first homography matrix.

20. The tangible non-transitory machine readable medium of claim 14, further comprising a plurality of instructions that in response to being executed result in a computing device
determining if the nearest previous frame has enough point correspondence with the model while determining if nearest subsequent frame has enough point correspondence with the model.

* * * * *